United States Patent
Su et al.

(10) Patent No.: US 12,535,252 B2
(45) Date of Patent: Jan. 27, 2026

(54) MEASUREMENT APPARATUS AND REFRIGERATION SYSTEM COMPRISING SAME

(71) Applicants: York (Wuxi) Air Conditioning and Refrigeration Co., Ltd., Wuxi (CN); Johnson Controls Tyco IP Holdings LLP, Milwaukee, WI (US)

(72) Inventors: Xiuping Su, Wuxi (CN); Li Wang, Wuxi (CN); Bin Yuan, Wuxi (CN); Chenggang Wu, Wuxi (CN)

(73) Assignees: York (Wuxi) Air Conditioning and Refrigeration Co., Ltd., Jiangsu (CN); Tyco Fire & Security GmbH, Neuhausen am Rheinfall (CH)

( * ) Notice: Subject to any disclaimer, the term of this patent is extended or adjusted under 35 U.S.C. 154(b) by 191 days.

(21) Appl. No.: 18/272,039

(22) PCT Filed: Jan. 6, 2022

(86) PCT No.: PCT/CN2022/070483
§ 371 (c)(1),
(2) Date: Jul. 12, 2023

(87) PCT Pub. No.: WO2022/152035
PCT Pub. Date: Jul. 21, 2022

(65) Prior Publication Data
US 2024/0125529 A1    Apr. 18, 2024

(30) Foreign Application Priority Data

Jan. 13, 2021 (CN) .......................... 202110042945.X

(51) Int. Cl.
*F25B 49/02*    (2006.01)
*G01N 21/59*    (2006.01)

(52) U.S. Cl.
CPC .............. *F25B 49/02* (2013.01); *G01N 21/59* (2013.01); *F25B 2500/28* (2013.01)

(58) Field of Classification Search
CPC .............. F25B 2500/06; F25B 2500/28; F25B 2600/0253; F25B 2600/2513;
(Continued)

(56) References Cited

U.S. PATENT DOCUMENTS 4,962,746 A    10/1990   Miyata et al.
5,072,595 A *   12/1991   Barbier .................. G01N 21/85
                                                       73/19.01

(Continued)

FOREIGN PATENT DOCUMENTS

CN    201241833 Y    5/2009
CN    104197596 A    12/2014
(Continued)

OTHER PUBLICATIONS

PCT International Search Report for PCT Application No. PCT/CN2022/070483, mailed Apr. 11, 2022, 3 pgs.

(Continued)

*Primary Examiner* — Henry T Crenshaw
(74) *Attorney, Agent, or Firm* — Fletcher Yoder, P.C.

(57) ABSTRACT

A measurement apparatus arranged on a pipe is configured to measure liquid content of a medium within the pipe. The apparatus includes a light transmission member, a light generation device, and a light reception device. The light generation device is configured to emit emission light toward the light transmission member such that it passes through an outer boundary wall of the light transmission member and has a preset emission angle. The light reception device is configured to receive reflection light after the emission light is reflected by an inner boundary wall of the light transmission member. The measurement apparatus can (Continued)

detect whether liquid is carried in a gaseous refrigerant exiting from an evaporator and measure the amount of carried liquid. The refrigeration system can adjust a throttling apparatus according to a measured result, and prevents the performance of the refrigeration system and a compressor from being affected.

10 Claims, 7 Drawing Sheets

(58) Field of Classification Search
CPC . F25B 49/005; F25B 49/02; G01N 2021/435; G01N 21/43; G01N 21/552; G01N 21/59; G01N 21/85
See application file for complete search history.

(56) References Cited

U.S. PATENT DOCUMENTS

| | | | |
|---|---|---|---|
| 5,870,185 A | 2/1999 | See et al. | |
| 7,905,099 B2* | 3/2011 | Justak | F25B 49/005 |
| | | | 73/19.1 |
| 8,316,708 B2* | 11/2012 | Horst | G01P 13/008 |
| | | | 116/276 |
| 11,073,313 B2* | 7/2021 | Senf, Jr. | F25D 11/003 |
| 11,085,683 B2* | 8/2021 | Contrada | F25B 49/022 |
| 2005/0081606 A1 | 4/2005 | Taira | |
| 2020/0300524 A1* | 9/2020 | Gallus | G01F 1/68 |

FOREIGN PATENT DOCUMENTS

| | | |
|---|---|---|
| CN | 106091510 A | 11/2016 |
| CN | 107810406 A | 3/2018 |
| CN | 109916858 A | 6/2019 |
| CN | 109916859 A | 6/2019 |
| CN | 110608470 A | 12/2019 |
| CN | 111044567 A | 4/2020 |
| CN | 111077098 A | 4/2020 |
| CN | 112082624 A | 12/2020 |
| CN | 112146315 A | 12/2020 |
| JP | 2001255046 A | 9/2001 |

OTHER PUBLICATIONS

CN Office Action for Chinese Application No. 202110042945.X mailed Jul. 5, 2023.
European Extended Search Report for EP Application No. 22738916. 0, dated Oct. 24, 2024, 13 pages.

* cited by examiner

MEASUREMENT APPARATUS AND REFRIGERATION SYSTEM COMPRISING SAME

CROSS-REFERENCE TO RELATED APPLICATIONS

This application is a U.S. National Stage Application of PCT Application No. PCT/CN2022/070483, entitled "MEASUREMENT APPARATUS AND REFRIGERATION SYSTEM COMPRISING SAME," filed Jan. 6, 2022, which claims priority to and the benefit of Chinese Patent Application No. 202110042945.X, filed Jan. 13, 2021, each of which is herein incorporated by reference in its entirety for all purposes.

TECHNICAL FIELD

The present application relates to a refrigeration system, in particular to a refrigeration system comprising a measurement apparatus.

BACKGROUND ART

An existing refrigeration system comprises a compressor, a condenser, a throttling apparatus and an evaporator connected in sequence, and a gaseous refrigerant discharged from the evaporator is then sucked by the compressor to form a circulation loop for the refrigerant. If the compressor sucks a gaseous refrigerant with refrigerant droplets (that is, suction with liquid carried), it will affect performance of the compressor and performance of the refrigeration system, and may even cause liquid hammer to damage the compressor. In a refrigeration system, certain measurement methods and control logics are generally required to prevent suction from carrying liquid.

SUMMARY OF THE INVENTION

In a first aspect, the present application provides a measurement apparatus, and the measurement apparatus is arranged on a pipe, and is configured to measure a liquid content of a medium within the pipe; the measurement apparatus comprises: a light transmission member, wherein the light transmission member is arranged on a pipe wall of the pipe, the light transmission member has a certain thickness and has an outer boundary wall and an inner boundary wall forming the thickness, the outer boundary wall has an outer boundary surface on a side opposite to the inner boundary wall, the inner boundary wall has an inner boundary surface on a side opposite to the outer boundary wall, and the inner boundary surface is in contact with the medium in the pipe; a light generation device, wherein the light generation device is arranged on the outer boundary surface of the light transmission member, and the light generation device is configured to emit emission light toward the light transmission member that passes through the outer boundary wall and has a preset emission angle; and a light reception device, wherein the light reception device is arranged on the outer boundary surface of the light transmission member, and the light reception device is configured to receive reflection light after the emission light is reflected by the inner boundary wall.

According to the above first aspect, when the medium in contact with the inner boundary surface is all gas, a critical angle of total reflection of a light ray on the inner boundary wall is a first total reflection angle; when the medium in contact with the inner boundary surface is all liquid, the critical angle of total reflection of the light ray on the inner boundary wall is a second total reflection angle; wherein a degree of the preset emission angle is between the first total reflection angle and the second total reflection angle.

According to the first aspect above, an enclosure is configured to enclose the light generation device and the light reception device in the enclosure.

According to the first aspect above, the light transmission member is sight glass.

According to the first aspect above, the light transmission member forms a part of the pipe wall, or is arranged on a connecting pipe protruding outward from the pipe wall.

In a second aspect, the present application provides a refrigeration system, comprising: a compressor, a condenser, a throttling apparatus and an evaporator, wherein the compressor, the condenser, the throttling apparatus and the evaporator are sequentially connected through the pipe to form a main circulation loop; the refrigeration system further comprises: the measurement apparatus according to the first aspect, the measurement apparatus being arranged on the pipe between an outlet of the evaporator and a suction port of the compressor; and a control apparatus, the control apparatus being communicatively connected with the measurement apparatus; wherein the control apparatus is configured to determine a liquid content in the medium between the outlet of the evaporator and the suction port of the compressor based on an intensity of the emission light emitted by the light generation device and an intensity of the reflection light received by the light reception device.

According to the second aspect above, the control apparatus is communicatively connected with the throttling apparatus, wherein the control apparatus is configured to adjust an opening degree of the throttling apparatus based on the liquid content in the medium.

According to the second aspect above, the refrigeration system has an operation mode and an adjustment mode, and the control apparatus is configured to make the measurement apparatus measure the liquid content of the medium when the refrigeration system is in the operation mode, and is configured to: maintain the operation mode when the measured liquid content of the medium is not greater than a predetermined liquid content threshold, and switch the refrigeration system from the operation mode to the adjustment mode when the measured liquid content of the medium is greater than the predetermined liquid content threshold.

According to the second aspect above, the adjustment mode comprises the following operations: judging whether a suction pressure of the compressor reaches a minimum suction pressure threshold; reducing a load of the compressor if the compressor reaches the minimum suction pressure threshold; and decreasing the opening degree of the throttling apparatus if the compressor does not reach the minimum suction pressure threshold.

According to the second aspect above, the liquid content in the medium is determined by a ratio of the intensity of the emission light emitted by the light generation device to the intensity of the reflection light received by the light reception device.

The present application provides a measurement apparatus and a refrigeration system comprising the measurement apparatus; the measurement apparatus can directly measure whether liquid is carried in a gaseous refrigerant discharged from an evaporator, as well as measure the amount of the carried liquid. The refrigeration system can adjust a throttling apparatus in a timely manner according to a measured result so as to avoid affecting the performance of the compressor and the refrigeration system.

DETAILED DESCRIPTION OF EMBODIMENTS

Various specific implementations of the present invention will be described below with reference to the accompanying drawings which form a part hereof. It should be understood that although directional terms such as "front", "rear", "upper", "lower", "left", "right", "top", "bottom", "inner", "outer" and the like are used in the present application to describe various example structural parts and elements of the present application, these terms are used herein for convenience of description only, and are determined based on the example orientations shown in the accompanying drawings. Since the embodiments disclosed in the present application can be arranged in different orientations, these directional terms are for illustration only and should not be regarded as limiting.

Figure 1:
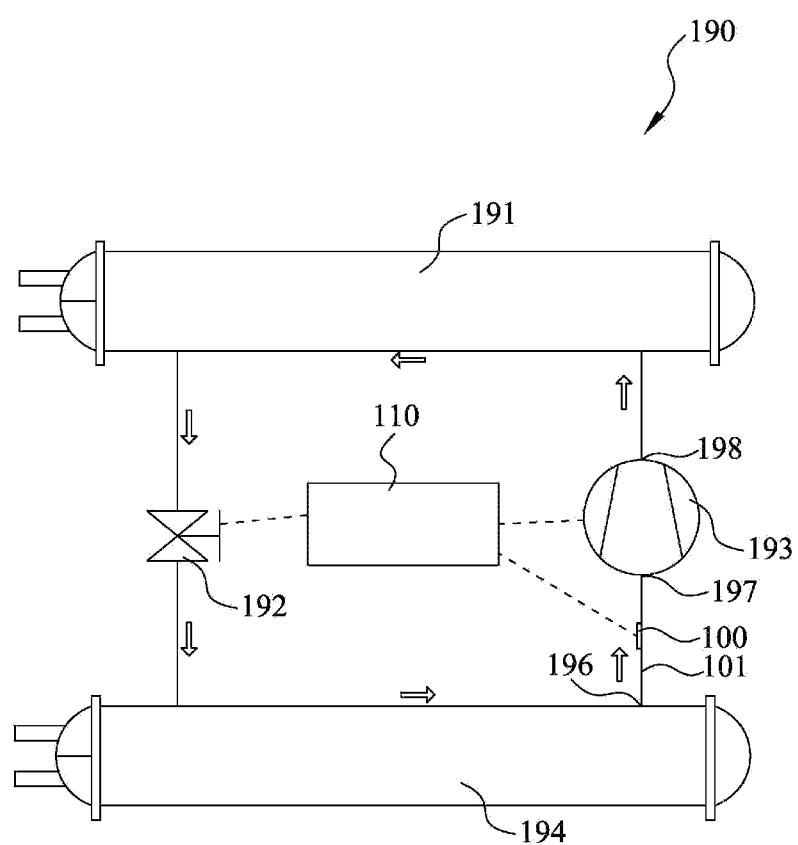
FIG. 1 is a schematic block diagram of a refrigeration system 190 according to the present application.

FIG. 1 is a schematic block diagram of a refrigeration system 190 of the present application, used to illustrate the position and function of a measurement apparatus 100 in the refrigeration system 190.

As shown in FIG. 1, the refrigeration system 190 comprises a compressor 193, a condenser 191, a throttling apparatus 192 and an evaporator 194, which are connected through a pipeline to form a closed system, and the system is filled with a refrigerant. Among them, the refrigerant flows through the compressor 193, the condenser 191, the throttling apparatus 192 and the evaporator 194 sequentially, so that the refrigeration system 190 can perform external refrigeration or heating. Specifically, a high-pressure gaseous refrigerant discharged from an exhaust port 198 of the compressor 193 flows into the condenser 191; it first passes through the condenser 191 to release heat so as to be condensed into a high-pressure liquid refrigerant, then is discharged from the condenser 191 and flows into the throttling apparatus 192 to be throttled into a low-pressure two-phase refrigerant before flowing into the evaporator 194 in which it absorbs heat to be evaporated into a low-pressure gas refrigerant; finally it flows out from an outlet 196 of the evaporator 194 to a suction port 197 of the compressor 193 to flow into the compressor 193 again; a circulation of the refrigerant is finished.

Among them, a pipe 101 is connected between the outlet 196 of the evaporator 194 and the suction port 197 of the compressor 193. In this embodiment, the refrigeration system 190 further comprises the measurement apparatus 100 and a control apparatus 110, and the control apparatus 110 is communicatively connected with the measurement apparatus 100, and is communicatively connected with the compressor 193 and the throttling apparatus 192. The measurement apparatus 100 is used to measure a liquid content of the gas refrigerant discharged from the outlet 196 of the evaporator 194, and transmit a measured result to the control apparatus 110, and the control apparatus 110 adjusts an opening degree of the throttling apparatus 192 based on the result measured by the measurement apparatus 100. As an example, the measurement apparatus 100 is arranged on the pipe 101 between the outlet 196 of the evaporator 194 and the suction port 197 of the compressor 193.

Figure 2A:
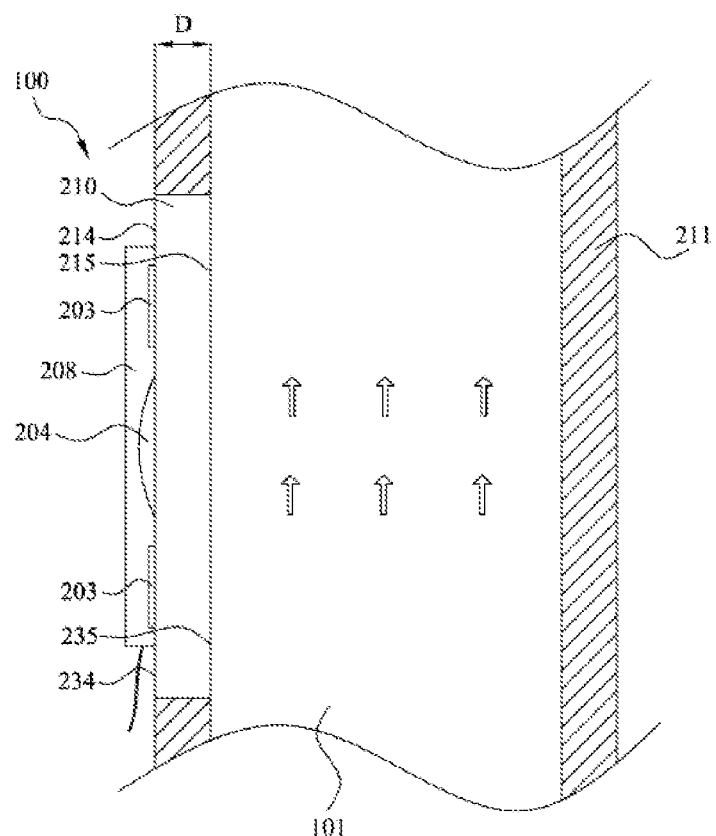
FIG. 2A is a partial cross-sectional view of one embodiment of a pipe 101 shown in FIG. 1.
Figure 2B:
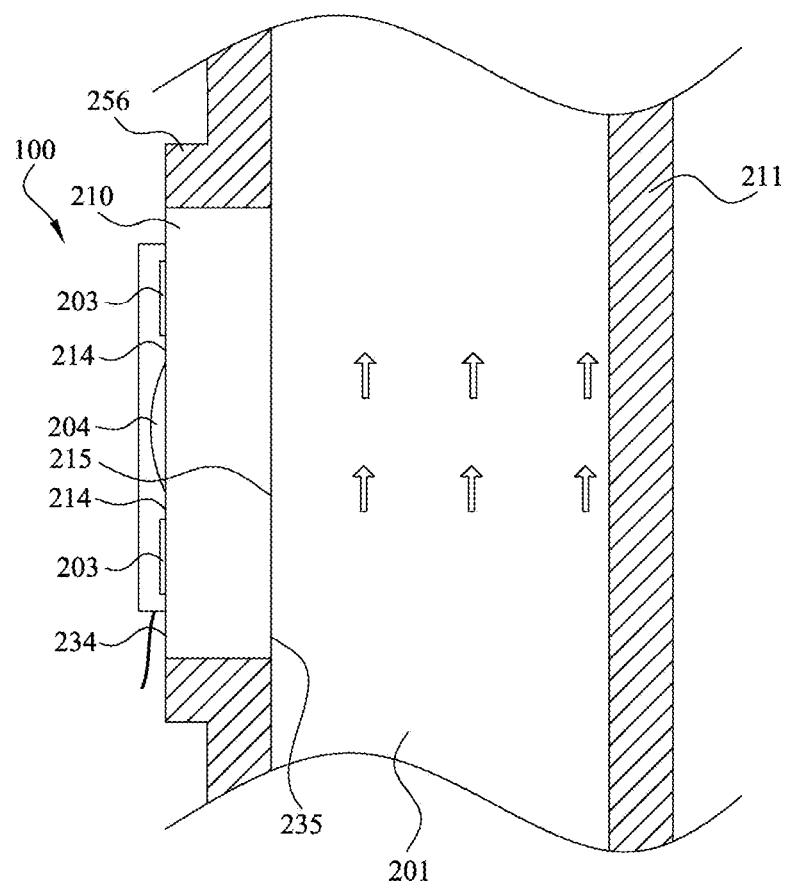
FIG. 2B is a partial cross-sectional view of another embodiment of a pipe 201.

FIG. 2A and FIG. 2B showing structures of axial sectional views of two embodiments of the pipe are used for illustrating a structure and connection position of the measurement apparatus 100, wherein in the embodiment shown in FIG. 2A, the measurement apparatus 100 is arranged on a pipe wall 211 of the pipe 101; in the embodiment shown in FIG. 2B, the measurement apparatus 100 is arranged on a connecting pipe 256 of a pipe 201. In this embodiment, a side inside the pipe 101 is defined as an inner side, and a side outside the pipe 101 is defined as an outer side.

As shown in FIG. 2A, the measurement apparatus 100 comprises a light transmission member 210, a light generation device 203 and a light reception device 204, the light transmission member 210 being embedded in the pipe wall 211 of the pipe 101 to form a part of the pipe wall 211; the light generation device 203 and the light reception device 204 being arranged on the outer side of the light transmission member 210. Specifically, the light transmission member 210 has an outer boundary wall 214 and an inner boundary wall 215, the outer boundary wall 214 being substantially flush with an outer surface of the pipe wall 211, and the inner boundary wall 215 being substantially flush with an inner surface of the pipe wall 211, so that if liquid in the refrigerant exceeds a certain range, small liquid droplets will be formed on the pipe wall 211 and the inner boundary wall 215 of the light transmission member 210. The outer boundary wall 214 and the inner boundary wall 215 are substantially parallel and separated by a certain distance, the separation distance forms a thickness D of the light transmission member 210, and the thickness D is substantially equal to a thickness of the pipe wall 211. The outer side of the outer boundary wall 214 of the light transmission member 210 (i.e., a side opposite to the inner boundary wall 215) forms an outer boundary surface 234, and the inner side of the inner boundary wall 215 of the light transmission member 210 (i.e., a side opposite to the outer boundary wall 214) forms an inner boundary surface 235. As a specific embodiment, the light transmission member 210 is sight glass made of a light transmission glass material; in other embodiments, the light transmission member 210 may also be made of other light transmission materials. When the light transmission member 210 is the sight glass, an operator may further directly observe the situation inside the pipe 101 through the light transmission member 210.

Both the light generation device 203 and the light reception device 204 are arranged on the outer boundary surface 234 of the light transmission member 210. The light generation device 203 is used to emit emission light 321 with a preset emission angle α toward the light transmission member 210, the emission light 321 is reflected on the inner boundary wall 215, and the light reception device 204 is used to receive the reflection light 322 after reflection (see FIG. 3A and FIG. 3B). In this embodiment, the emission angle refers to an included angle between the emission light 321 and a normal line of the inner boundary wall 215 (see FIG. 3A and FIG. 3B). The light generation device 203 and the light reception device 204 are communicatively connected with the control apparatus 110, so that the control apparatus 110 controls the light generation device 203 to emit the emission light with the preset emission angle $\alpha$, and the control apparatus 110 receives an intensity of the reflection light received by the light reception device 204. In this embodiment, the light generation device 203 comprises two light generation devices 203 arranged along a length direction of the pipe 101, and the light reception device 204 is arranged between the two light generation devices 203. According to the different emission angles $\alpha$ of the emission light emitted by the light generation devices 203, the light reception device 204 may also be arranged at other positions. Also, the number of the light generation devices 203 may also be set to other numbers. As an example, in order for the light reception device 204 to identify a received light ray, the light generation device 203 may emit emission light 321 of a certain fixed wavelength.

In the embodiment as shown in FIG. 2A, the inner boundary surface 235 can make contact with the refrigerant in the pipe 101 when the refrigerant flows through in the pipe 101 in the direction as indicated by the hollow arrows. If the liquid in the refrigerant exceeds a certain range, small liquid droplets will be formed on the pipe wall 211 and the inner boundary wall 215 of the light transmission member 210. The gas or liquid refrigerant at the inner side of the inner boundary surface 235 forms an optically thinner medium, and the light transmission member 210 between the outer boundary wall 214 and the inner boundary wall 215 at the outer side of the inner boundary surface 235 forms an optically denser medium. When the light generation device 203 emits a light ray toward the light transmission member 210, the light ray can pass through the inner boundary wall 215 into the pipe 101 from the light transmission member 210 and be reflected or refracted from the inner boundary wall 215.

When refrigerant gas or refrigerant liquid flows through the pipe 101, the light ray has different critical angles of total reflection on the inner boundary wall 215. When the refrigerant flowing through the pipe 101 is gas, the critical angle of total reflection of the light ray on the inner boundary wall 215 is a first total reflection angle; when the refrigerant flowing through the pipe 101 is liquid, the critical angle of total reflection of the light ray on the inner boundary wall 215 is a second total reflection angle. By controlling an incident angle $\alpha$ of the emission light between the first total reflection angle and the second total reflection angle, the emission light can be allowed to be reflected totally and received by the light reception device 204 when the refrigerant flowing through the pipe 101 is gas; while when there is liquid in the pipe 101, the emission light cannot be reflected totally, with a part of the emission light refracted and unable to be received by the light reception device 204. As a specific example, if the refrigerant is R134a and the light transmission member 210 is the sight glass, the first total reflection angle is about 42.5°, the second total reflection angle is about 53°, and the preset incident angle $\alpha$ is about 42.5° to 53°. It should be noted that the critical angle of total reflection here refers to an incident angle when a refraction angle of the light ray on an interface is exactly 90° (that is, when the refracted light ray is along the interface) when the light ray is emitted from the optically denser medium to the optically thinner medium. When the incident angle is greater than the critical angle of total reflection, the light can be totally reflected from the inner boundary wall 215.

Still as shown in FIG. 2A, the measurement apparatus 100 further comprises an enclosure 208, and the enclosure 208 can enclose the light generation device 203 and the light reception device 204 in the enclosure 208. As an example, the enclosure 208 may be made of an opaque material.

In the embodiment as shown in FIG. 2B, the light transmission member 210 is not directly arranged on the pipe wall 211 of the pipe 201 to form a part of the pipe wall 211, but is arranged on the connecting pipe 256. The connecting pipe 256 is formed by protruding outward from the pipe wall 211 along a radial direction of the pipe 201. The inner boundary wall 215 of the light transmission member 210 is still substantially flush with the inner surface of the pipe wall 211, so that if liquid in the refrigerant exceeds a certain range, small liquid droplets can still be formed on the pipe wall 211 and the inner boundary wall 215 of the light transmission member 210. In some embodiments, the connecting pipe 256 may be arranged as a connecting flange, so as to facilitate disassembly of the measurement apparatus 100.

Figure 3A:
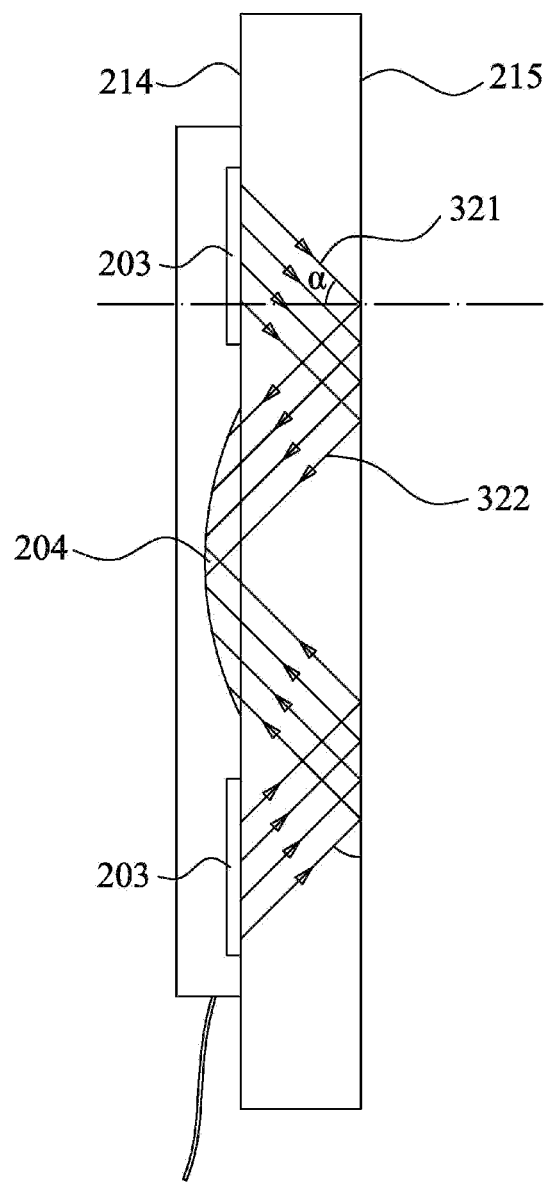
FIG. 3A is a schematic diagram of an optical path of a measurement apparatus 100 shown in FIG. 1 when no liquid droplets are contained in a refrigerant.
Figure 3B:
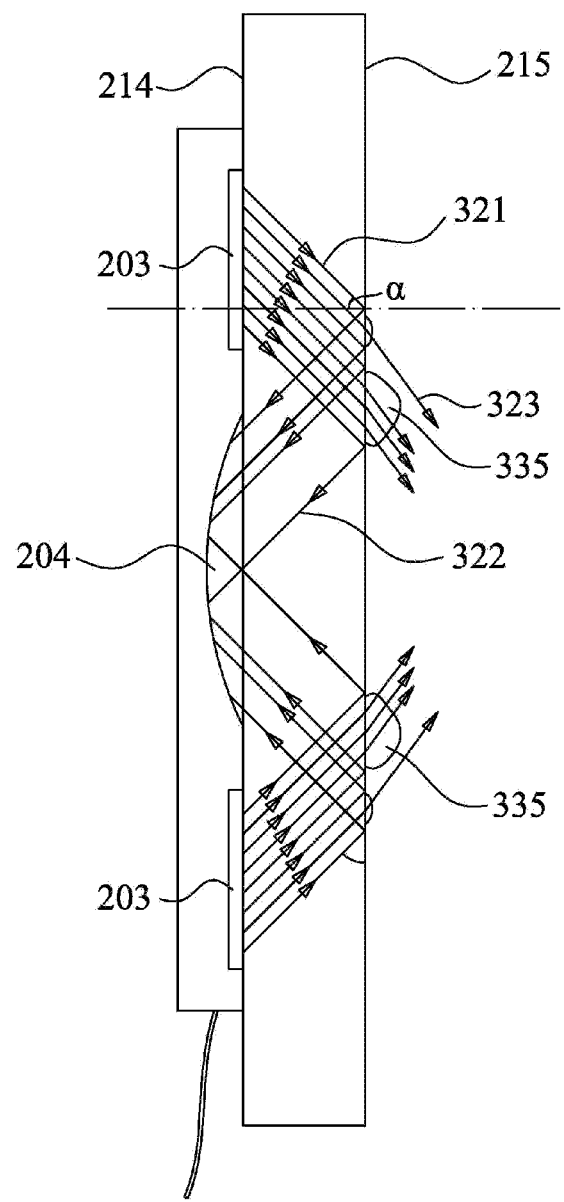
FIG. 3B is a schematic diagram of an optical path of the measurement apparatus 100 shown in FIG. 1 when liquid droplets are contained in the refrigerant.

FIG. 3A and FIG. 3B show the schematic diagram of an optical path of the measurement apparatus 100, wherein FIG. 3A shows the schematic diagram of an optical path when the refrigerant does not comprise liquid droplets, and FIG. 3B shows the schematic diagram of an optical path when the refrigerant comprises liquid droplets. It should be noted that, in order to more clearly show the different optical paths of the light ray in the refrigerant gas and the refrigerant liquid droplets, the reflection phenomenon occurring when the light ray passing through the refrigerant liquid droplets is not shown in the figures.

As shown in FIG. 3A, when the refrigerant does not contain liquid droplets, the emission light 321 with the preset emission angle $\alpha$ emitted from the light generation device 203 can be totally reflected from the inner boundary wall 215 to obtain the reflection light 322. The light reception device 204 can receive all of the reflection light 322.

As shown in FIG. 3B, when the refrigerant contains liquid droplets (such as liquid droplets 335 shown in the figure), a part of the emission light 321 with the preset emission angle $\alpha$ emitted from the light generation device 203 can be totally reflected from the inner boundary wall 215 to obtain the reflection light 322, and another part is refracted from the liquid droplets 335 to obtain the refracted light 323. The light reception device 204 can only receive that part of the reflection light 322 but cannot receive the refracted light 323.

Thus, based on a ratio of the intensity of the emission light 321 emitted by the light generation device 203 to the intensity of the reflection light 322 received by the light reception device 204, the liquid content in the refrigerant gas can be determined. As a specific example, the intensity ratio of the reflection light 322 received by the light reception device 204 to the emission light 321 emitted by the light generation device 203 has a preset value, and the preset value reflects a predetermined liquid content threshold of the liquid content in the refrigerant gas. When the intensity ratio is not greater than the preset value, it means that the liquid content in the refrigerant gas is not greater than the liquid content threshold; and when the intensity ratio is smaller than the preset value, it means that the liquid content in the refrigerant gas is greater than the liquid content threshold.

Based on the liquid content in the refrigerant gas reflected by the intensity ratio, the opening degree of the throttling apparatus may be adjusted.

Figure 4:
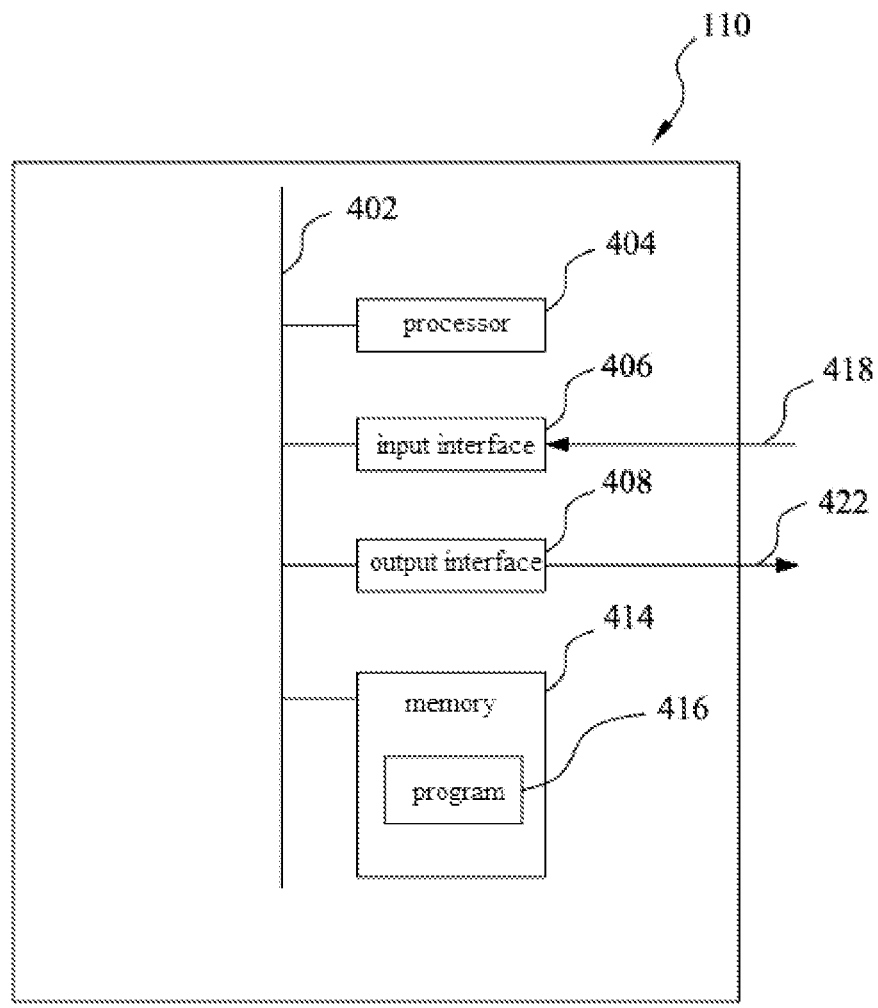
FIG. 4 is a schematic structural block diagram of a control apparatus 110 in the refrigeration system 190 shown in FIG. 1.

FIG. 4 is a schematic structural block diagram of the control apparatus 110 in the refrigeration system 190. As shown in FIG. 4, the control apparatus 110 comprises a bus 402, a processor 404, an input interface 406, an output interface 408, and a memory 414 with a control program 416. Various components in the control apparatus 110, including the processor 404, the input interface 406, the output interface 408 and the memory 414, are communicatively connected to the bus 402, so that the processor 404 can control the operation of the input interface 406, the output interface 408 and the memory 414. Specifically, the memory 414 is used to store programs, instructions and data, and the processor 404 is used to read the programs, instructions and data from the memory 414 and can write data to the memory 414. The processor 404 controls the operation of the input interface 406 and the output interface 408 by executing the programs and instructions read from the memory 414.

As shown in FIG. 4, the input interface 406 is communicatively connected with the compressor 193 and the measurement apparatus 100 through a connection 418, and the output interface 408 is communicatively connected with the throttling apparatus 192 and the compressor 193 through a connection 422. Those skilled in the art can understand that the control apparatus 110 may also be connected with other components of the refrigeration system 190 to realize basic functions of the refrigeration system 190. Thus, by executing the programs and instructions in the memory 414, the processor 404 controls the operation of the refrigeration system 190.

Figure 5:
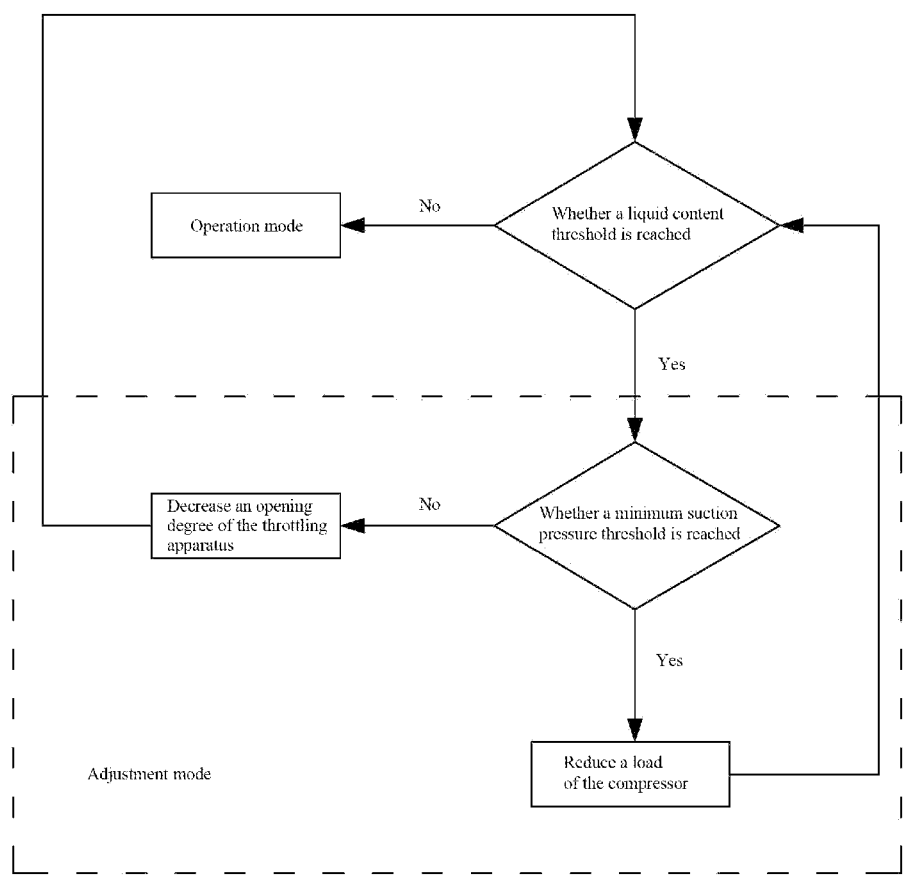
FIG. 5 is a flowchart of an adjustment mode of the refrigeration system 190 shown in FIG. 1.

FIG. 5 shows a flowchart of an adjustment mode of the refrigeration system 190. As shown in FIG. 5, the refrigeration system 190 has an operation mode and the adjustment mode. In the operation mode, the control apparatus 110 receives a measured result of the measurement apparatus 100, when the measurement apparatus 100 measures that the liquid content of the refrigerant gas in the pipe 101 is within a liquid content threshold range, the control apparatus 110 maintains the operation mode of the refrigeration system 190, and when the measurement apparatus 100 measures that the liquid content of the refrigerant gas in the pipe 101 is greater than the liquid content threshold, the control apparatus 110 switches the refrigeration system 190 from the operation mode to the adjustment mode. In the adjustment mode, the control apparatus 110 sends a control signal to the throttling apparatus 192 via the output interface 408 based on data of the compressor 193 and the measurement apparatus 100 input from the input interface 406 to adjust the liquid content of the refrigerant gas in the pipe 101 to the liquid content threshold range. When the measurement apparatus 100 measures that the liquid content of the refrigerant gas in the pipe 101 is within the liquid content threshold range, the control apparatus 110 switches the refrigeration system 190 from the adjustment mode back to the operation mode.

In the adjustment mode, the control apparatus 110 first judges whether suction pressure of the compressor 193 reaches a minimum suction pressure threshold. If the compressor 193 does not reach the minimum suction pressure threshold, the opening degree of the throttling apparatus 192 is decreased. If the compressor 193 reaches the minimum suction pressure threshold, it means that the opening degree of the throttling apparatus 192 cannot be further decreased, so the control apparatus 110 reduces a load of the compressor 193.

The refrigeration system of the present application directly measures the liquid content in the refrigerant gas discharged from the evaporator and sucked into the compressor through the measurement apparatus arranged on the pipe between the outlet of the evaporator and the suction port of the compressor, so that the measured results are timely and accurate. According to the measured results, the control apparatus can adjust the refrigeration system in time to prevent sucked gas of the compressor from being carrying liquid, which will affect the performance of the compressor and the refrigeration system. The measurement apparatus of the present application is particularly suitable for measuring the liquid content in gas when the gas contains a small amount of liquid.

Although the present disclosure has been described in conjunction with examples of the embodiments outlined above, various alternatives, modifications, changes, improvements and/or substantial equivalents, whether known or foreseeable either now or in the near future, may be obvious to those of at least ordinary skill in the art. In addition, the technical effects and/or technical problems described in this specification are exemplary and not limiting; therefore, disclosures in this specification may be used to solve other technical problems and have other technical effects and/or can solve other technical problems. Accordingly, the examples of the embodiments of the present disclosure set forth above are intended to be illustrative and not limiting. Various variations may be made without departing from the spirit or scope of the present disclosure. Accordingly, the present disclosure is intended to encompass all known or earlier developed alternatives, modifications, changes, improvements and/or substantial equivalents.

The invention claimed is:

1. A measurement apparatus for a refrigeration system, wherein the measurement apparatus is configured to be arranged on a pipe between an evaporator and a compressor and configured to measure a liquid content of a medium in the pipe, wherein the measurement apparatus comprises:
   a controller comprising a processor and a memory;
   a light transmission member arranged on a pipe wall of the pipe, wherein the light transmission member has a thickness and has an outer boundary wall and an inner boundary wall forming the thickness, the outer boundary wall has an outer boundary surface on a side opposite to the inner boundary wall, the inner boundary wall has an inner boundary surface on a side opposite to the outer boundary wall, and the inner boundary surface is in contact with the medium in the pipe;
   a light emitter arranged on the outer boundary surface of the light transmission member, wherein the light emitter is communicatively coupled to the controller, and the controller is configured to control the light emitter to emit emission light toward the light transmission member and through the outer boundary wall at a preset emission angle ($\alpha$); and
   a light receiver arranged on the outer boundary surface of the light transmission member, wherein the light receiver is communicatively coupled to the controller, and the light receiver is configured to receive reflection light after the emission light is reflected by the inner boundary wall.

2. The measurement apparatus of claim 1, wherein:
   a critical angle of total reflection of a light ray on the inner boundary wall is a first total reflection angle when the medium in contact with the inner boundary surface is all gas;

the critical angle of total reflection of the light ray on the inner boundary wall is a second total reflection angle when the medium in contact with the inner boundary surface is all liquid; and a degree of the preset emission angle (α) is between the first total reflection angle and the second total reflection angle.

3. The measurement apparatus of claim 1, comprising an enclosure enclosing the light emitter and the light receiver.

4. The measurement apparatus of claim 1, wherein the light transmission member is a sight glass.

5. The measurement apparatus of claim 1, wherein the light transmission member forms a part of the pipe wall or is arranged on a connecting pipe protruding outward from the pipe wall.

6. A refrigeration system, comprising:

a compressor, a condenser, a throttling apparatus and an evaporator, wherein the compressor, the condenser, the throttling apparatus and the evaporator are sequentially connected through a pipe to form a main circulation loop configured to direct a medium therethrough;

the refrigeration system further comprising:

a measurement apparatus arranged on the pipe between an outlet of the evaporator and a suction port of the compressor, wherein the measurement apparatus comprises a light transmission member, a light emitter configured to emit emission light, and a light receiver configured to receive reflection light via the light transmission member; and a controller communicatively connected with the measurement apparatus, wherein the controller is configured to:

control the light emitter to emit the emission light toward the light transmission member at a preset emission angle (α); and determine a liquid content in the medium between the outlet of the evaporator and the suction port of the compressor based on an intensity of the emission light emitted by the light emitter and an intensity of the reflection light received by the light receiver.

7. The refrigeration system of claim 6, wherein the controller is communicatively connected with the throttling apparatus and the controller is configured to adjust an opening degree of the throttling apparatus based on the liquid content in the medium.

8. The refrigeration system of claim 7, wherein the refrigeration system has an operation mode and an adjustment mode, the controller is configured to control the measurement apparatus to measure the liquid content of the medium during operation of the refrigeration system in the operation mode, and the controller is configured to:

maintain operation of the refrigeration system in the operation mode when a measured liquid content of the medium is not greater than a predetermined liquid content threshold; and switch the refrigeration system from the operation mode to the adjustment mode when the measured liquid content of the medium is greater than the predetermined liquid content threshold.

9. The refrigeration system of claim 8, wherein, in the adjustment mode, the controller is configured to:

determine whether a suction pressure of the compressor reaches a minimum suction pressure threshold;

reduce a load of the compressor when the suction pressure of the compressor reaches the minimum suction pressure threshold; and decrease the opening degree of the throttling apparatus when the suction pressure of the compressor does not reach the minimum suction pressure threshold.

10. The refrigeration system of claim 6, wherein the controller is configured to determine the liquid content in the medium based on a ratio of the intensity of the emission light emitted by the light emitter to the intensity of the reflection light received by the light receiver.

* * * * *